(12) United States Patent
Magnussen et al.

(10) Patent No.: US 9,060,384 B2
(45) Date of Patent: Jun. 16, 2015

(54) WIRELESS COMMUNICATION NETWORK BETWEEN PARTICIPANTS OF AN ASSIMILATION STEP

(75) Inventors: Bjoern Magnussen, Kassel (DE); Stefan Boerger, Kassel (DE); Stefan Schmidt, Bad Emstal (DE); Raimund Thiel, Bad Zwesten (DE)

(73) Assignee: SMA Solar Technology AG, Niestetal (DE)

( * ) Notice: Subject to any disclaimer, the term of this patent is extended or adjusted under 35 U.S.C. 154(b) by 410 days.

(21) Appl. No.: 13/490,601

(22) Filed: Jun. 7, 2012

(65) Prior Publication Data

US 2012/0244809 A1    Sep. 27, 2012

Related U.S. Application Data

(63) Continuation of application No. PCT/EP2010/069324, filed on Dec. 9, 2010.

(30) Foreign Application Priority Data

Dec. 10, 2009    (EP) .................................... 09178731

(51) Int. Cl.
*H04B 7/00* (2006.01)
*H04W 4/00* (2009.01)
(Continued)

(52) U.S. Cl.
CPC .................. *H04W 84/18* (2013.01); *H02J 3/38* (2013.01); *H02J 3/383* (2013.01); *H02J 13/0075* (2013.01);
(Continued)

(58) Field of Classification Search
CPC ......... H02J 13/0075; H02J 3/38; H02J 3/383; H04W 4/08; H04W 4/26; H04W 84/18; H04W 8/26; Y02B 10/14; Y02B 90/2653; Y02E 10/563; Y02E 40/72; Y02E 60/7853; Y04S 10/123; Y04S 40/126
USPC ....................... 455/41.2, 426.2, 440; 370/332
See application file for complete search history.

(56) References Cited

U.S. PATENT DOCUMENTS 8,233,456 B1 *    7/2012  Kopikare et al. ............. 370/332
2003/0226013 A1   12/2003 Dutertre
(Continued)

FOREIGN PATENT DOCUMENTS

DE    102007005665 A1    1/2008
DE    102008014574 A1    9/2009

OTHER PUBLICATIONS

International Search Report dated Feb. 28, 2011 for International Application No. PCT/EP2010/069324. 13 Pages.
(Continued)

*Primary Examiner* — Ping Hsieh
*Assistant Examiner* — Xia Jia
(74) *Attorney, Agent, or Firm* — Eschweiler & Associates, LLC

(57) ABSTRACT

A method of building a wireless communication network between a plurality of pre-defined devices which include spatially distributed inverters for feeding electric energy into an AC power grid and which each have a spatially limited range in wireless communication is provided. The method includes the steps of assimilating the pre-defined devices for a limited period of time, and in the step of assimilating, generating at least one network ID and persistently storing the at least one network ID in each pre-defined device participating in the step of assimilating. The method further includes, after the step of assimilating, connecting each pre-defined device exclusively to such other pre-defined devices in which network IDs originating from the same step of assimilating are stored.

20 Claims, 2 Drawing Sheets

(51) Int. Cl.
  *H04W 36/00* (2009.01)
  *H04W 84/18* (2009.01)
  *H02J 3/38* (2006.01)
  *H02J 13/00* (2006.01)
  *H04W 4/08* (2009.01)
  *H04W 4/26* (2009.01)
  *H04W 8/26* (2009.01)

(52) U.S. Cl.
  CPC . *H04W 4/08* (2013.01); *H04W 4/26* (2013.01); *H04W 8/26* (2013.01); *Y02E 10/563* (2013.01); *Y04S 10/123* (2013.01); *Y02B 10/14* (2013.01); *Y02B 90/2653* (2013.01); *Y04S 40/126* (2013.01); *Y02E 60/7853* (2013.01)

(56) References Cited

U.S. PATENT DOCUMENTS

| | | |
|---|---|---|
| 2005/0055417 A1 | 3/2005 | Reich et al. |
| 2006/0002328 A1 | 1/2006 | Naghian |
| 2007/0115868 A1 | 5/2007 | Chen et al. |
| 2008/0004017 A1* | 1/2008 | Shimizu ............... 455/435.1 |
| 2010/0299519 A1* | 11/2010 | Xiao et al. .............. 713/155 |
| 2011/0221269 A1* | 9/2011 | Borger et al. ............ 307/26 |

OTHER PUBLICATIONS

Office Action Dated Jun. 12, 2014 Japanese Patent Application No. 2012-542554.

\* cited by examiner

WIRELESS COMMUNICATION NETWORK BETWEEN PARTICIPANTS OF AN ASSIMILATION STEP

REFERENCE TO RELATED APPLICATIONS

This application is a continuation of International Application No. PCT/EP2010/069324, filed on Dec. 9, 2010, which claims priority to European Application No. 09178731.7, filed on Dec. 10, 2009, the contents of which are hereby incorporated by reference in their entirety.

FIELD

The invention relates to a method of building a wireless communication network between a plurality of pre-defined devices, wherein the plurality of pre-defined devices include spatially distributed inverters for feeding electric energy into an AC power grid and wherein each pre-defined device has a spatially limited range in wireless communication. Further, the invention relates to a radio interface for communication of a device in a wireless communication network which includes several inverters for feeding electric energy into an AC power grid and which is built-up according to the method of the invention, wherein the radio interface has a limited spatial range.

BACKGROUND

German Patent Application Publication DE 10 2007 005 665 A1 discloses a communication system for wirelessly transferring data via radio links. In this known communication system a communication network is built-up as a multi hop network starting from a root node. The communication between the individual nodes is according to the Bluetooth standard. The root node is a dedicated participant of the communication network which connects to spatially adjacent participants, which in turn connect to further spatially adjacent participants, wherein they form further nodes of the network themselves. Thus, the communication network builds-up in a tree structure, which, however, does not need to be regular, i.e. the logical arrangement of the nodes may differ from the functional command structure of its participants, and may even vary between different times at which the communication network is built-up, for example, due to variable interference of individual radio links.

German Patent Application Publication DE 10 2007 005 665 A1 does not deal with how, in building the communication network, it is acknowledged whether a device which is in the direct reach of the root node or within its indirect reach via other nodes is a desired participant of the communication network to be built-up. In the practical implementation of this known communication system, however, a switch is provided in the respective radio interface which can be set to different values for defining the participants of the respective communication network. Only such devices are incorporated in the communication network built-up starting from the root node, which have been pre-defined in that the switch in their radio interface has been set to the same value as in the root node.

With increasing density of installed photovoltaic power plants the risk increases that neighboring photovoltaic power plants comprise overlapping ranges in wireless communication. With an accidentally same setting of the switches for the network definition in the radio interfaces of the respective participants, an undesired connection between neighboring communication networks may occur. With an even further increasing density the limited number of possible switch positions for network definition in the radio interfaces will even then not be sufficient, when photovoltaic power plants that overlap each other with regard to the range in wireless communication are purposefully set to different network definition values.

US Patent Application Publication 2006/0002328 A1 discloses a network system comprising a plurality of network nodes, each of the network nodes comprising means for temporarily forming a group with at least one of the plurality of network nodes, sending means for sending information which may include voice, text message, images etc. to the group, and receiving means for receiving information from the group. The sending means and the receiving means are configured to provide a direct contact via a radio connection between at least two network nodes of the group.

German Patent Application Publication DE 10 2008 014 574 A1 discloses a solar module comprising an integrated programmable short-range radio controller, for example according to the ZigBee or Bluetooth standard. Sensors which are provided for monitoring operation data of the solar module are connected to the interfaces of the radio controller. In this way, the obtained data are available via radio transmission. One or more central devices receive the data transmitted by the radio controller and store them in a data base. Here, the data are available for further use. The central device may be connected to the internet or a LAN via a gateway.

US Patent Application Publication 2003/0226013 A1 discloses a scalable distributed management of wireless virtual private networks including application of intrusion tolerant concepts to a software infrastructure for supporting secure group applications. This application is suited for use with network layer protocol such as TBRPF and is particularly adapted for wireless networks, most specifically mobile ad hoc networks.

US Patent Application Publication 2005/0055417 A1 discloses a distributed sensor network in which one or more devices forming a collaborative group are associated with a physical phenomenon based on geographical proximity. The sensor network is capable of detecting new phenomena in changing the membership of the collaborative group as the phenomenon changes. Sensors not associated with the detected phenomenon are available to detect new phenomena, and one group may exist per phenomenon. Upon detection of a phenomenon, a group of nodes is formed and a leader node is elected. As the phenomenon changes over time, new devices come into proximity of the phenomenon and are prevented from forming independent groups associated with the phenomenon. This is accomplished in a decentralized way with communication restricted to local neighbors. In a tracking sensor network using a relatively small number of sensors, the sensors are active and maintain a coherent belief associating their measurements with a single common vehicle.

Thus, there still is a need for a method and a radio interface which ensure that a wireless communication network is always only built-up over a fixed group of participants, without increasing the efforts in installing a new photovoltaic power plant or in adding a new component to an existing photovoltaic power plant, for example.

SUMMARY

In one aspect, the present invention provides a method of building a wireless communication network between a plurality of pre-defined devices. The plurality of pre-defined devices includes spatially distributed inverters for feeding electric energy into an AC power grid. Each pre-defined device has a spatially limited range in wireless communication. The method comprises the step of assimilating the pre-defined devices for a limited period of time, and in the step of assimilating, generating at least one network ID and persistently storing the at least one network ID in each pre-defined device participating in the step of assimilating. After the step of assimilating, the method comprises connecting each pre-defined device exclusively to such other pre-defined devices in which network IDs originating from the same step of assimilating are stored.

In another aspect, the present invention provides a radio interface for communication of a device in a wireless communication network which includes several inverters for feeding electric energy into an AC power grid and which is built-up according to the above method, for example. This radio interface has a limited spatial range. The radio interface includes a persistent storage for at least one network ID that is defined in a step of assimilating in which the radio interface is participating, wherein the radio interface, after the step of assimilating, exclusively connects to such other radio interfaces in which network IDs originating from the same step of assimilating are stored.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
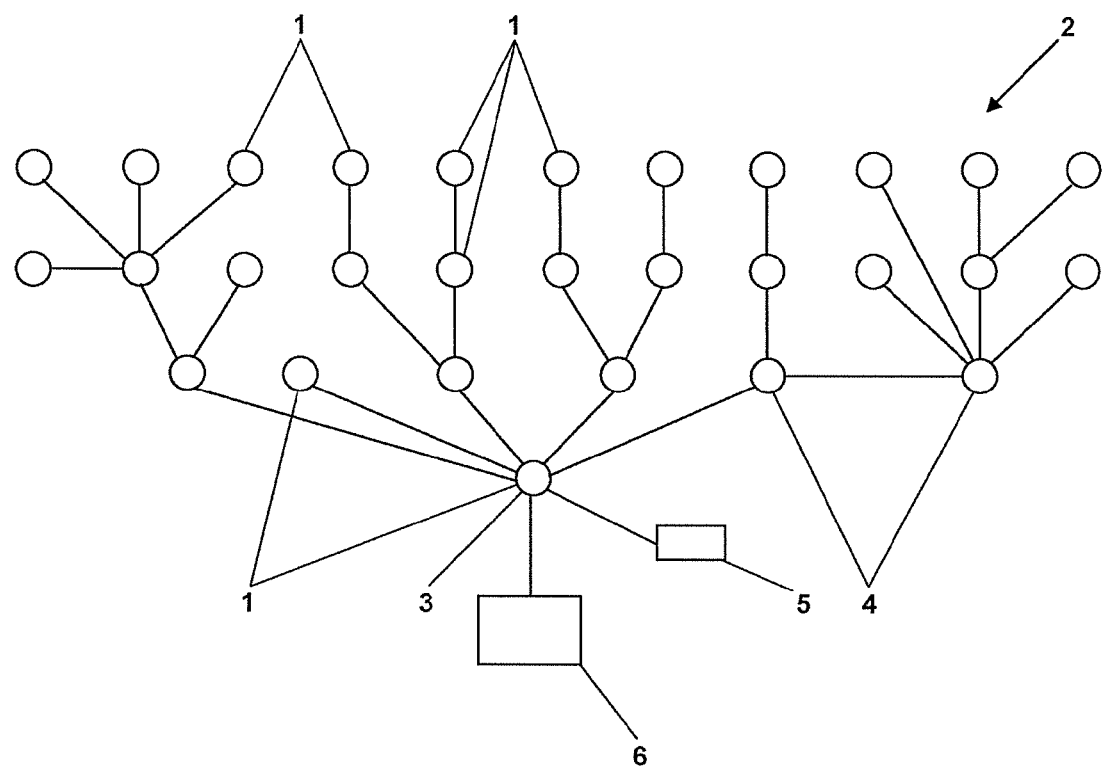
FIG. 1 illustrates a communication network that, starting from one device which acts as a root node is built-up between a plurality of participants in a tree-like structure. In this communication network, further participants also serve as nodes, and an external control device accesses the communication network via the root node.

The invention relates to a method of building a wireless communication network between a plurality of pre-defined devices, wherein the plurality of pre-defined devices include spatially distributed inverters for feeding electric energy into an AC power grid and wherein each pre-defined device has a spatially limited range in wireless communication. Further, the invention relates to a radio interface for communication of a device in a wireless communication network which includes several inverters for feeding electric energy into an AC power grid and which is built-up according to the method of the invention, wherein the radio interface has a limited spatial range.

The particular type of the wireless communication network is not relevant for the present invention. However, this does not mean that all types of wireless communication networks are equally well suites for implementing the present invention. For example, such communication networks which are based on infrared technology and which thus require a visual contact between the individual participants are in principle less suited than radio-based communication networks. In a radio-based communication network it proves to be advantageous to use a tested standard. This may, for example, be the Bluetooth standard in which the reach of the individual participants typically ranges between 10 m without amplifier and up to 100 m with amplifier.

The present invention does not relate to any and every wireless communication networks but only to such wireless communication networks in which inverters for feeding electric energy, for example from generators driven by regenerative energy, particularly from wind power stations and photovoltaic generators, into an AC power grid are participating. Further participants in such communication networks may be so-called repeaters to securely connect participants which are further away despite their limited spatial range in wireless communication. Data loggers may also be incorporated in such a communication network. Often, the communication network allows for a control unit assessing all data available in the communication network via one of the participants and to send and distribute commands to the single participants via the communication network.

In the new method of building a wireless communication network, a step of assimilating is carried out for a limited interval of time. In this step of assimilating at least one network ID is defined and is stored (e.g., persistently) in each participant of the step of assimilating. After the step of assimilating, each participant only connects with such other participants in which network IDs originating from the same step of assimilating are stored. That is, the possible participants of the wireless communication network are fixed after the step of assimilating. The communication between the participants may—like in case of inverters of a photovoltaic power plant at night—be interrupted, but in building the communication network again, the connections are limited to those devices, in which net IDs originating from the same step of assimilating are stored. This also has the meaning that, even within a spatially limited range in wireless communication, once the step of assimilating has been conducted for a first communication network, a second communication network between other participants may be built-up without any undesired connection between the two communication networks taking place. With automation of the step of assimilating, which may be realized without problem as will be shown in the following, the implementation of the new method of installing a new plant does not require higher efforts than before.

The at least one network ID may, for example, be defined depending on the individual device ID of at least one participant involved in the step of assimilating and/or depending on the point in time of the step of assimilating. In the simplest case the net ID is the device ID of one participant involved in the step of assimilating, like for example of one participant which is intended as a root node of the communication network or the lowest or highest device ID of all participants of the step of assimilating. Alternatively, the net ID is the absolute point in time of the step of assimilating, for example in the form of the date and the time of the end of the step of assimilating, or any other code generated of these and/or other data, like for example the sum of the device IDs of all participants of the step of assimilating.

Typically, the pre-defined participants build-up a preliminary communication network during the step of assimilating, and the network ID is transferred between the connected participants during the step of assimilating.

In one embodiment of the method, the connected participants at first communicate their individual device ID during the step of assimilating. From these device IDs, a participant list including the device IDs of all participants involved in the step of assimilating may be established, which is then persistently stored in each of the participants as the at least one network ID. After the step of assimilating, each participant only connects to such devices whose device ID is included in its stored participant list.

In implementing the new method, checking the membership of a device to a communication network can be further enhanced in that, in addition to checking whether the device is included in the participant list of a member of the communication network which the device tries to contact, it is also checked whether this same participant list is stored in the device. This may, for example, also take place by comparing a check sum calculated from the entries in the participant list. To this end, the complete participant list does not need to be exchanged between the devices getting into contact.

In this context, it has to be noted that the new method is only to a very limited extent provided and suited for ensuring data security, i.e. to prevent unauthorized access to data within the communication network. Instead, the goal of the new method is to reliably distinguish between networks that spatially overlap with regard to their range in wireless communication in actual operation.

In the step of assimilating, the participant list of the communication network or any other network ID can be established within a distinguished device and distributed from there over all other devices on the participant list. The distinguished device may be that one from which the step of assimilating is started. These functions, however, do not need to coincide. Thus, the step of assimilating may be started from each of the pre-defined participants, and the net ID or the participant list may, for example, always be established in that participant which forms the root node of the communication network.

The method may also comprise a correction step in which the participant list is amended, for example by external access of a control unit to the distinguished participant in which the participant list is established. In this way, for example, single participants which may have made contact during the step of assimilating but which do not belong to the desired communication network may be excluded manually.

When in a system, over which the communication network built-up according to the new method extends, a device, which is a desired participant of the communication network, is replaced or added, such a device may be manually added to the participant list, and this participant list may then be distributed to all participants, or another network ID may be manually stored in the new participant. However, in such a case it is desirable to repeat the step of assimilating in one embodiment. In this repetition of the step of assimilating, the participant lists in the individual participants of the previous communication network may be complemented with the new participant, or the previous participant lists or other net IDs are deleted, and the building of the communication network takes place with a full step of assimilating as in case of a completely new power plant.

To automatically execute the step of assimilating, it may, for example, be started, after setting up the power plant, by turning on a distinguished pre-defined device which is intended to serve as a root node of the desired communication network for the first time. It is also important that the step of assimilating terminates at a defined point in time. To this end, it may, for example, run for a limited interval of time after its start. A remainder of this interval of time may always at least be extended to a defined period of time, when a new pre-defined device enters the step of assimilating. Instead of starting it by turning on the individual participants, the step of assimilating may also be started by operating a special switch provided at the individual participants.

The participant list established in the step of assimilating may be limited to a pre-determined number of participants, and the step of assimilating may be terminated when this number of participants has been reached. As a rule, the number of participants of a desired communication network is fixed and can be easily determined, particularly much easier than the individual device IDs of these desired network participants, for example.

In the method, even in the step of assimilating, only such devices may at all connect, which comply with pre-defined criteria. It belongs to these criteria that the respective device is at all able to participate in the method in that it comprises a persistent storage for the participant list or the other network ID. Further, this storage should—as an indication that the respective device does not already belong to another communication network—be empty. Further possibilities of pre-defining the possible participants of the communication network are that—for example by switches in the respective radio interfaces—identical network definitions are set.

A simple and practicable means of pre-defining the desired participants of the communication network is by a pre-defined maximum interval of time after turning-on the respective devices for the first time or after clearing the persistent network ID storage of the respective devices. The danger of an undesired connection between devices of two plants, over which separate communication networks are to be built-up, thus reduces to the improbable case that their steps of assimilating are executed simultaneously and with the same pre-definitions. The probability of this case is by several times smaller than the probability that there is an undesired mixing up of participants between two neighboring communication networks built-up according to the prior art.

In the new radio interface of limited spatial range to be used in a participant of a wireless communication network including several inverters for feeding electric energy and particularly built-up according to the method, a dedicated persistent storage for at least one network ID established during a step of assimilating in which the participant is involved is provided. After the step of assimilating, the participant only connects to those other participants in which net IDs originating from the same step of assimilating are stored.

A switch may be provided at the radio interface, upon the operation of which the storage for the at least one network ID is deleted and/or the participation of the device provided with the radio interface in a new step of assimilating is started.

Particularly, in one embodiment the radio interface may be part of an inverter for feeding electric energy into an AC power grid.

Referring now in greater detail to the drawings, all circles in FIG. 1 represent inverters 1 by which electric energy, like for example from photovoltaic generators, is fed into an AC power grid. A wireless communication network 2 is formed between these inverters 1. This communication network 2 expands like a tree from an inverter 1 serving as a root node 3, and extends from there as a multi-hop-network over all further inverters. Here, other inverters 1 also serve as nodes 4 at which the communication network 2 branches. Besides the inverters 1 a data logger 5 is incorporated into the communication network 2 as a participant. An external control device 6 accesses the communication network 2 via the root node 3 but is no participant of the communication network 2 itself. The communication network 2 is wireless, i.e. the connections between the individual participants 1, 5, which are indicated in FIG. 1 by lines, are radio connections, like for example according to the Bluetooth standard. To this end, the individual participants 1, 5 each comprise a radio interface according to this standard.

Figure 2:
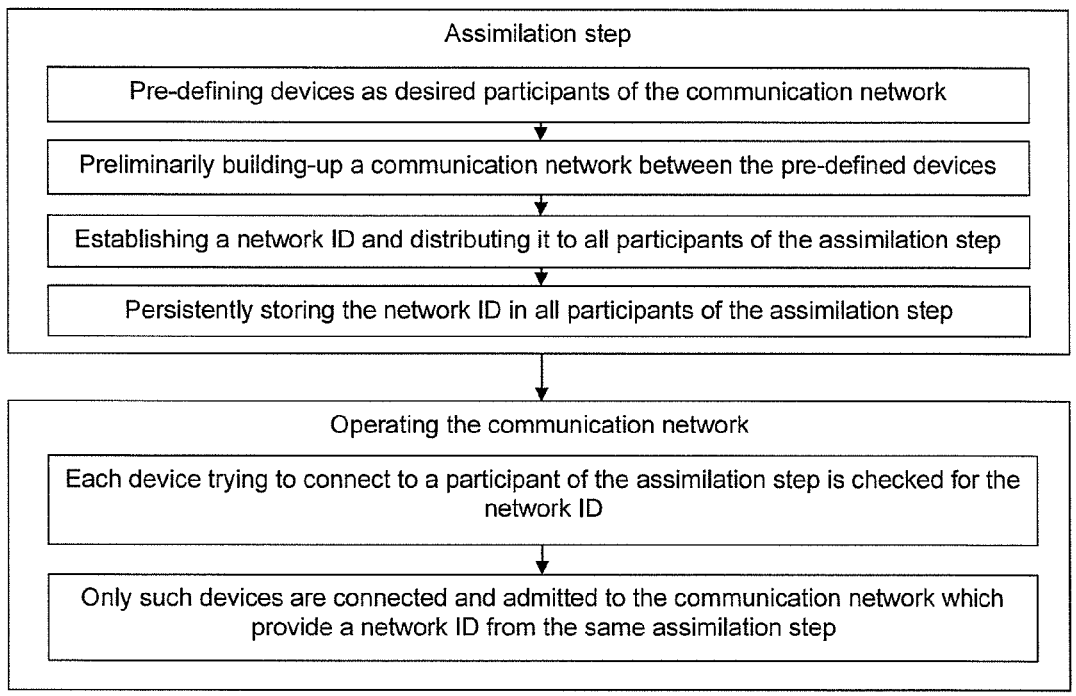
FIG. 2 is a block diagram of a method of building the communication network of FIG. 1.

To complete the communication network 2 with regard to its participants 1, 5 such that, for example, a further communication network of the same type may be built-up spatially close to or even overlapping with the communication network 2 without collisions between these communication networks, a step of assimilating or assimilation step according to FIG. 2 is executed after all participants 1, 5 have been turned on for the first time. In this assimilation step, a preliminary communication network is set up. Then a participant list of all participants 1, 5 is established as a network ID for the desired future communication network. This network ID is transmitted to all participants 1, 5, and persistently stored in all participants 1, 5 of the assimilation step. In normal operation of the communication network after this assimilation step, all participants 1, 5 only connect to such other participants 1, 5, which are, on the one hand, listed in the participant list included in them, and in which, on the other hand, the same participant list is stored.

Via the external controller 6 according to FIG. 1, the participant list may be manipulated in that single participants are purposefully cancelled or added. Alternatively, after exchanging a participant 1, 5 or expanding the system by a new participant, the assimilation step may be repeated so that no manipulation of the participant list is needed. In the participant list, the individual participants 1, 5 may be listed with their device ID. This device ID typically is an IP address which is individually assigned to each device. Even in the assimilation step, not all and any devices, which are at all able to communicate with the participants 1, 5 according to the presently used communication standard, like for example, the Bluetooth standard, are admitted to the preliminary communication network. Instead, even in the assimilation step, connections are limited to such participants 1, 5 which have a storage for storing the participant list. The pre-definition of the possible members of the communication network 2 may additionally include that these participants have only been switched on yet for a limited period of time, have no participant list already stored, and/or are set to an identical network identification of several selectable network identifications. By persistently storing the participant list in the individual participants 1, 5 of the communication network 2, the group of the participants 1, 5 remains closed, even if the communication network 2 is temporarily turned down, or if individual participants 1, 5 temporarily check out of the communication network 2, like for example because an inverter 1 fed by a photovoltaic generator switches off at night time. If such a participant 1 is switched on again, it may connect to the other participants 1, 5 of the communication network 2 again due to the identical participant lists stored in all participants, independently of which of the other participants 1, 5 it is contacting. Thus, the particular tree structure of the communication network 2 which results in a communication network 2 according to the Bluetooth standard will depend on which temporal and spatial sequence pairing occurs between the individual participants 1, 5.

The invention claimed is:

1. A method of building a wireless communication network between a plurality of pre-defined devices, wherein the plurality of pre-defined devices include spatially distributed inverters for feeding electric energy into an AC power grid, wherein each pre-defined device has a spatially limited range in wireless communication, the method comprising:
   assimilating each of the pre-defined devices during a limited period of time;
   in the step of assimilating, generating at least one network ID and storing the at least one network ID in each pre-defined device participating in the step of assimilating; and
   after the step of assimilating, connecting each pre-defined device exclusively to such other pre-defined devices in which the at least one network ID originating from the same step of assimilating is stored.

2. The method of claim 1, wherein the at least one network ID is generated from at least one individual device ID of a corresponding pre-defined device participating in the step of assimilating.

3. The method of claim 1, wherein the at least one network ID is defined depending on a point in time of the step of assimilating.

4. The method of claim 1, wherein the same network ID is stored in each pre-defined device participating in the step of assimilating.

5. The method of claim 1, wherein the pre-defined devices connect to each other in the step of assimilating.

6. The method of claim 5, wherein, in the step of assimilating, the pre-defined devices transmit their individual device ID, and wherein a participant list with the device IDs of all pre-defined devices participating in the step of assimilating is used to generate the at least one network ID.

7. The method of claim 6, wherein, after the step of assimilating, each pre-defined device exclusively connects to such other pre-defined devices whose device ID is included in the participant list stored in it.

8. The method of claim 6, wherein, in the step of assimilating, the participant list is limited to a pre-determined number of pre-defined devices.

9. The method of claim 6, wherein, in the step of assimilating, the participant list is established in one of the pre-defined devices participating in the step of assimilating and distributed from there to all other pre-defined devices listed in the participant list.

10. The method of claim 6, further comprising a correction step, in which the participant list is amended by a control device, transmitted to the pre-defined devices and stored therein, the control device accessing the communication network via one of the pre-defined devices having participated in the step of assimilating.

11. The method of claim 6, further comprising an enlarging step, in which a pre-defined device is added to the participant list, and the enlarged participant list is transmitted to all pre-defined devices having participated in the step of assimilating and persistently stored there.

12. The method of claim 1, wherein the step of assimilating is started from one of the pre-defined devices.

13. The method of claim 12, wherein, wherein the step of assimilating is started from a pre-defined device provided as a root node of the communication network.

14. The method of claim 1, wherein a remainder of the limited period of time for which the step of assimilating will continue is at least extended to a pre-determined interval of time at each instance at which a further pre-defined device connects.

15. The method of claim 1, wherein the pre-defined devices are pre-defined for participating in the step of assimilating by having at least one of the following features:
   a dedicated storage for storing the network ID;
   an empty storage for storing the network ID;
   a not yet expired pre-determined maximum period of time after clearance of a storage for storing the network ID;
   a network definition set to a same value;

a not yet expired pre-determined maximum period of time after having been switched on for the first time; and a not yet expired pre-determined maximum period of time after operation of a dedicated switch.

16. A radio interface for communication of a device in a wireless communication network which includes several inverters for feeding electric energy into an AC power grid and which is built-up according to a method of building a wireless communication network between a plurality of spatially distributed inverters for feeding electric energy into an AC power grid, wherein each pre-defined device has a spatially limited range in wireless communication, the method comprising:

assimilating each of the pre-defined devices during a limited period of time;

in the step of assimilating, generating at least one network ID and storing the at least one network ID in each pre-defined device participating in the step of assimilating; and after the step of assimilating, connecting each pre-defined device exclusively to such other pre-defined devices in which the at least one network ID originating from the same step of assimilating is stored, wherein the radio interface has a limited spatial range, wherein the radio interface includes a storage component for at least one network ID that is defined in the step of assimilating in which the radio interface is participating, wherein the radio interface, after the step of assimilating, is configured to exclusively connect to such other radio interfaces in which network IDs originating from the same step of assimilating are stored.

17. The radio interface of claim 16, further comprising a switch configured to clear the storage component for the at least one network ID.

18. The radio interface of claim 16, further comprising a switch configured to selectively initiate participation of the radio interface in the step of assimilating.

19. The radio interface of claim 16, further comprising a switch configured to set a network definition value therein.

20. An inverter for feeding electric energy into an AC power grid having a radio interface for communication of a device in a wireless communication network which includes several inverters for feeding electric energy into an AC power grid and which is built-up according to a method of building a wireless communication network between a plurality of spatially distributed inverters for feeding electric energy into an AC power grid, wherein each pre-defined device has a spatially limited range in wireless communication, the method comprising:

assimilating each of the pre-defined devices during a limited period of time;

in the step of assimilating, generating at least one network ID and storing the at least one network ID in each pre-defined device participating in the step of assimilating; and after the step of assimilating, connecting each pre-defined device exclusively to such other pre-defined devices in which the at least one network ID originating from the same step of assimilating is stored, wherein the radio interface has a limited spatial range, wherein the radio interface includes a storage component for at least one network ID that is defined in the step of assimilating in which the radio interface is participating, wherein the radio interface, after the step of assimilating, is configured to exclusively connect to such other radio interfaces in which network IDs originating from the same step of assimilating are stored.

* * * * *